United States Patent
Matumoto et al.

(10) Patent No.: US 10,899,923 B2
(45) Date of Patent: Jan. 26, 2021

(54) RESIN COMPOSITION, MOLDED PRODUCT AND PRODUCTION METHOD THEREOF

(71) Applicant: Asahi Yukizai Corporation, Nobeoka (JP)

(72) Inventors: Yasuhiro Matumoto, Aichi (JP); Takanori Inoue, Aichi (JP); Yasuo Kurachi, Tokyo (JP)

(73) Assignee: Asahi Yukizai Corporation, Miyazaki (JP)

( * ) Notice: Subject to any disclaimer, the term of this patent is extended or adjusted under 35 U.S.C. 154(b) by 0 days.

(21) Appl. No.: 16/345,317

(22) PCT Filed: Oct. 27, 2017

(86) PCT No.: PCT/JP2017/038980
§ 371 (c)(1),
(2) Date: Apr. 26, 2019

(87) PCT Pub. No.: WO2018/079737
PCT Pub. Date: May 3, 2018

(65) Prior Publication Data
US 2019/0300698 A1    Oct. 3, 2019

(30) Foreign Application Priority Data

Oct. 28, 2016  (JP) .................................. 2016-212293

(51) Int. Cl.
*C08L 63/04*  (2006.01)
*B29B 7/14*   (2006.01)
(Continued)

(52) U.S. Cl.
CPC ................ *C08L 63/04* (2013.01); *B29B 7/14* (2013.01); *C08G 59/621* (2013.01); *C08J 3/005* (2013.01);
(Continued)

(58) Field of Classification Search
CPC .. C08L 101/00; C08L 63/00–10; C08L 67/02; C08L 87/00; C08L 81/02;
(Continued)

(56) References Cited

U.S. PATENT DOCUMENTS 3,354,129 A * 11/1967 Edmonds, Jr. ...... C08G 75/0295
528/265
4,081,422 A *  3/1978 Cordes .................. C08G 63/52
524/130
(Continued)

FOREIGN PATENT DOCUMENTS

JP    53-42298 A    4/1978
JP    9-124839 A    5/1997
(Continued)

OTHER PUBLICATIONS

Partial machine translation of JP H11-349793 A (2020).*
(Continued)

*Primary Examiner* — Kregg T Brooks
(74) *Attorney, Agent, or Firm* — Norris McLaughlin, P.A.

(57) ABSTRACT

Provided is a resin composition having improved fluidity in a molten state maintained without lowering heat resistance, containing: a polymer being a reaction product of a first organic compound having a phenolic hydroxyl group and a second organic compound having a glycidyl group, Mw of the polymer being no greater than 10,000; and a thermoplastic resin other than the polymer. A proportion of the polymer contained in the resin composition is from 0.1% to 30% by mass. A melting point of the thermoplastic resin is no less than 200° C. The thermoplastic resin has a benzene ring in a molecule. The polymer and the thermoplastic resin have blended to form a homogeneous phase. Also provided are a molded product formed from the aforementioned resin composition, and a production method of a molded product including: kneading the resin composition by chaotic mix-
(Continued)

ing; and molding a kneaded product obtained after the kneading.

9 Claims, 3 Drawing Sheets

(51) Int. Cl.
    *C08J 3/00*     (2006.01)
    *C08L 81/02*     (2006.01)
    *C08L 61/26*     (2006.01)
    *C08L 101/00*     (2006.01)
    *C08G 59/62*     (2006.01)
    *C08L 61/06*     (2006.01)

(52) U.S. Cl.
    CPC .............. *C08L 61/06* (2013.01); *C08L 61/26* (2013.01); *C08L 81/02* (2013.01); *C08L 101/00* (2013.01); *C08L 2203/30* (2013.01); *C08L 2205/06* (2013.01); *C08L 2205/16* (2013.01); *C08L 2207/04* (2013.01)

(58) Field of Classification Search
    CPC .......... C08L 81/04; C08L 69/00; C08L 61/06; C08J 2300/00; C08J 2463/00–10; C08J 2367/02; C08J 2387/00; C08J 2381/02; C08J 2381/04; C08J 2369/00; C08G 59/621
See application file for complete search history.

(56) References Cited

U.S. PATENT DOCUMENTS

| | | |
|---|---|---|
| 5,837,799 A | 11/1998 | Chen et al. |
| 5,840,793 A * | 11/1998 | Glaser ................ C08L 23/06 524/423 |
| 6,270,855 B1 * | 8/2001 | Jung ................ B05D 1/265 427/482 |
| 2007/0088107 A1 * | 4/2007 | Meyer ................ C08L 69/00 524/114 |
| 2008/0161468 A1 * | 7/2008 | Juikar ................ C08F 14/18 524/423 |
| 2009/0239988 A1 * | 9/2009 | Jiang ................ C08L 69/00 524/420 |
| 2012/0123056 A1 | 5/2012 | Kobayashi et al. |

FOREIGN PATENT DOCUMENTS

| | | | |
|---|---|---|---|
| JP | 11-116960 A | | 4/1999 |
| JP | 11-349793 A | | 12/1999 |
| JP | 2002322304 A | * | 11/2002 |
| JP | 2011-11362 A | | 1/2011 |
| JP | 2012-046710 A | | 3/2012 |
| JP | 2014-148583 A | | 8/2014 |
| JP | 2015-189075 A | | 11/2015 |
| JP | 2015-210840 A | | 11/2015 |

OTHER PUBLICATIONS

J.M. Ottino, et al.; "Chaotic Mixing Processes: New Problems and Computational Issues"; Chaos, Solitons & Fractals, vol. 6, pp. 425-438 (Cited in Specification).

* cited by examiner

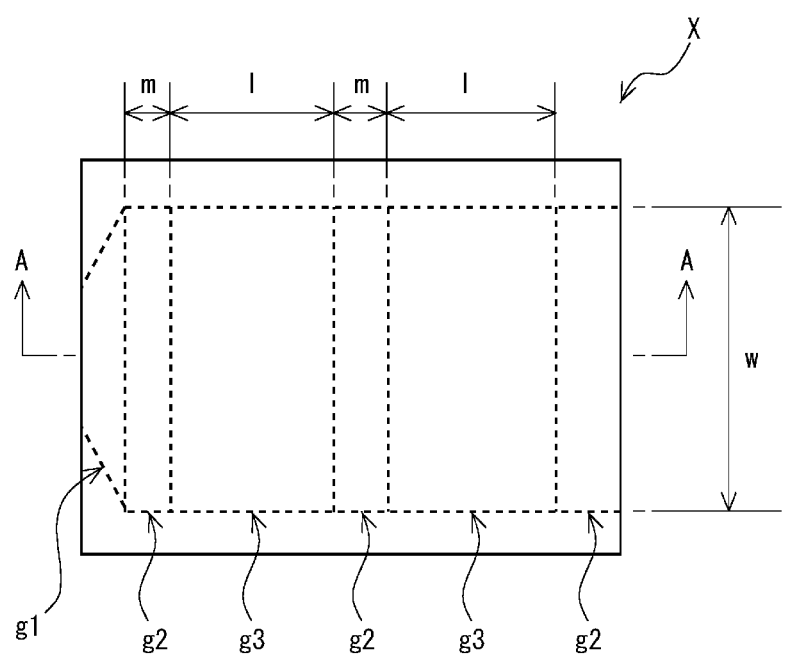
F I G. 1

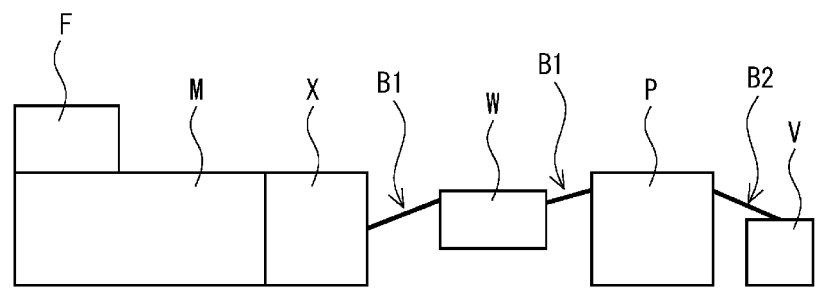
F I G. 3

RESIN COMPOSITION, MOLDED PRODUCT AND PRODUCTION METHOD THEREOF

TECHNICAL FIELD

The present invention relates to a resin composition, a molded product, and a production method thereof.

BACKGROUND ART

A resin composition containing a thermoplastic resin has been utilized for production of molded products in various industrial fields, owing to fluidity exhibited in a molten state at high temperature by heating. In the production of a molded product, it is important to stabilize the fluidity of the resin composition in a molten state, in light of improvement of followability, etc. Particularly in a case of a resin composition in which a reinforcement material, e.g., a carbon fiber, as a filler is dispersed in a thermoplastic resin having a high melting point (for example no less than 200° C.), viscosity of the resin composition in a molten state may be lowered due to the filler such as the reinforcement material added. Accordingly, it is important that sufficient fluidity can be ensured even at a temperature close to the melting point of the thermoplastic resin.

For stabilization of fluidity of a resin composition in a molten state, procedures such as improvement of a shape of a molded product to be formed, improvement of a die, and selective use of a thermoplastic resin have typically been adopted. Specifically, a molded product is disclosed in which a rib portion and a boss portion each having a thickness of no greater than 2.5 mm are formed by using, for example in stamping molding, a base having high fluidity formed through lamination of sheet-like pre-pregs obtained with material ratios attainable in view of a correlation between: the shapes of the rib portion and the boss portion; and a length and a content of continuous fiber (see Japanese Unexamined Patent Application, Publication No. 2011-11362). As another example, a connector and a production method thereof are disclosed that improve fluidity of a resin composition during insertion molding (see Japanese Unexamined Patent Application, Publication No. 2015-210840). As still another example, a metal mold is disclosed that enables evenly distributed temperature in a resin composition in a molten state (see Japanese Unexamined Patent Application, Publication No. 2015-189075). As yet another example, it is disclosed that fluidity of a resin composition in a molten state is can be improved through combination of a plurality of types of thermoplastic resins (Japanese Unexamined Patent Application, Publication No. 2014-148583). However, these procedures have disadvantages that the shape of the molded product, the molding method, the type of the thermoplastic resin, and the like are limited.

In addition to the aforementioned procedures, a procedure of reducing molecular weight of a thermoplastic resin has also been well-known as a stabilization procedure of fluidity of a resin composition in a molten state; however, this procedure may deteriorate a mechanical physical property of a molded product to be formed therefrom.

The resin composition containing a thermoplastic resin having a high melting point has also a problem of limited types of additives (e.g., plasticizers) suitable for stabilization of fluidity in a molten state. A reason for the problem is that since common plasticizers have relatively low melting point and boiling point, such plasticizers can be used for a thermoplastic resin having a low melting point (for example less than 200° C.) but can hardly be used for a thermoplastic resin having a high melting point (for example no less than 200° C.). Another reason for the problem is that a resin composition obtained by adding an additive to a thermoplastic resin tends to lack physical properties inherent to the thermoplastic resin, due to lowering of glass transition point (Tg), modulus of elasticity and the like that serve as markers of heat resistance, caused by the plasticizing effect. These problems are particularly remarkable in the case of using a low-molecular weight compound such as a plasticizer as the additive.

PRIOR ART DOCUMENTS

Patent Documents

Patent Document 1: Japanese Unexamined Patent Application, Publication No. 2011-11362
Patent Document 2: Japanese Unexamined Patent Application, Publication No. 2015-210840
Patent Document 3: Japanese Unexamined Patent Application, Publication No. 2015-189075
Patent Document 4: Japanese Unexamined Patent Application, Publication No. 2014-148583

SUMMARY OF THE INVENTION

Problems to be Solved by the Invention

The present invention was made in view of the foregoing circumstances, and an object of the present invention is to provide a resin composition that has improved fluidity in a molten state which can be maintained without lowering heat resistance.

Means for Solving the Problems

The present inventors have thoroughly investigated in view of the aforementioned problems, and consequently found that the aforementioned problems can be solved by blending a specific polymer with a thermoplastic resin.

According to an aspect of the invention made for solving the aforementioned problems, a resin composition contains: a polymer that is a reaction product of a first organic compound having a phenolic hydroxyl group and a second organic compound having a glycidyl group, a weight average molecular weight of the polymer being no greater than 10,000; and a thermoplastic resin other than the polymer.

Due to blending of the thermoplastic resin with the polymer that is a reaction product of a first organic compound having a phenolic hydroxyl group and a second organic compound having a glycidyl group, a weight average molecular weight of the polymer being no greater than 10,000, the resin composition is superior in fluidity in a molten state and capable of maintaining heat resistance of a molded product to be formed therefrom. The reason for the resin composition achieving the aforementioned effects due to the constitution is not necessarily clarified; however, it is considered that the polymer is capable of improving fluidity of the resin composition in a molten state through being favorably dispersed in various types of thermoplastic resins and thereby weakening interaction between molecules, for example, due to having a relatively less polar moiety derived from an aromatic ring and a relatively more polar moiety derived from an ether structure and a hydroxy group. Meanwhile, it is considered that, due to not being a low-molecular weight compound, the polymer is capable of inhibiting lowering of heat resistance of the thermoplastic resin caused by the plasticizing effect, and is consequently capable of maintaining heat resistance of a molded product to be formed from the resin composition. In addition, owing to fluidity in a molten state improved by the polymer, the resin composition is capable of maintaining sufficient fluidity at a temperature close to the melting point of the thermoplastic resin, even in a case in which the carbon fiber, etc. is added.

It is preferred that the glycidyl group is one of a glycidyl ether group, a glycidyl ester group and a glycidyl amino group. In the case in which the glycidyl group is one of a glycidyl ether group, a glycidyl ester group and a glycidyl amino group, an improvement of fluidity of the resin composition in a molten state and maintenance of heat resistance of a molded product to be formed from the resin composition are enabled to be more reliably achieved.

It is preferred that a proportion of the polymer contained in the resin composition is no less than 0.1% by mass and no greater than 30% by mass. In the case in which the proportion of the polymer contained falls within the above range, fluidity of the resin composition in a molten state is enabled to be more improved, while lowering of heat resistance of a molded product caused by the plasticizing effect is inhibited.

It is preferred that a melting point of the thermoplastic resin is no less than 200° C. Since common plasticizers have relatively low melting point and boiling point, such plasticizers can be used for a thermoplastic resin having a low melting point (for example, less than 200° C.) but can hardly be used for a thermoplastic resin having a high melting point (for example no less than 200° C.). To the contrary, the aforementioned polymer is capable of, even when used for a thermoplastic resin having a high melting point, producing an effect of improving fluidity of the resin composition in a molten state, while maintaining heat resistance of a molded product to be formed from the resin composition.

It is preferred that the thermoplastic resin has a benzene ring in a molecule. When the thermoplastic resin has a benzene ring in the molecule, compatibility with the aforementioned polymer having a phenolic hydroxyl group is enabled to be improved, and consequently the effect of improving fluidity of the resin composition in a molten state is enabled to be reliably produced.

It is preferred that the polymer and the thermoplastic resin have blended to form a homogeneous phase. When the polymer and the thermoplastic resin have thus blended to form a homogeneous phase, in other words when the polymer and the thermoplastic resin are homogeneously mixed, an improvement of fluidity of the resin composition in a molten state and maintenance of heat resistance of a molded product to be formed from the resin composition are enabled to be more reliably achieved.

According to another aspect of the invention made for solving the aforementioned problems, a molded product is formed from the resin composition according to the above-described aspect of the present invention.

Due to being formed from the resin composition according to the above-described aspect, the molded product is enabled to be easily and reliably formed while heat resistance is maintained.

According to still another aspect of the invention made for solving the aforementioned problems, a production method of a molded product includes: kneading the resin composition according to the above-described aspect by chaotic mixing; and molding a kneaded product obtained after the kneading.

Due to sufficient kneading of the resin composition according to the above-described aspect by chaotic mixing, the production method of a molded product enables a molded product to be easily and reliably produced while maintaining heat resistance. In general, a low-viscosity fluid such as water can be efficiently mixed by generating a turbulent flow; however, generating a turbulent flow of a high-viscosity fluid such as a molten resin composition requires great energy and is therefore difficult. Accordingly, for efficiently kneading the high-viscosity fluid homogeneously, chaotic mixing in which a fluid is mixed in a laminar flow is preferred, instead of generating a turbulent flow.

The concept of chaotic mixing will be described below. In mixing of two fluids, time evolution of a boundary face between two fluids can be obtained by solving an equation governing the dynamics of fluid particles, by using as an initial value a position of every point on the boundary face in an initial state. For rapid blending of the two fluids, the superficial dimension of the boundary face must increase exponentially, and a distance between two points on the boundary face which were extremely close to each other in an initial stage of mixing must increase exponentially, in order that the boundary face may be folded at small intervals. As set forth above, "chaotic mixing" as referred to means mixing having a chaotic solution for an equation governing the dynamics of fluid, in which a distance between two points increases exponentially over time. Detailed descriptions of chaotic mixing can be found in, for example, pages 425 to 438 of "Chaos, Solitons & Fractals Vol. 6".

The "phenolic hydroxyl group" as referred to means a hydroxyl group bonding to an aromatic ring such as a benzene ring, a naphthalene ring, an anthracene ring or a pyrene ring. The "polymer" as referred to means a compound formed by polymerization of one or two or more types of monomers through a chemical reaction, and typically means a mixture of a plurality of types of compounds having similar primary structures but different molecular weights. The "melting point" as referred to means a peak-top temperature measured in a differential scanning calorimetry (DSC) carried out at a rate of temperature rise of 10° C./min. The "homogeneous phase" as referred to means a phase in which no separate phases are observed with an electron microscope.

Effects of the Invention

The resin composition of the present invention is superior in fluidity in a molten state, and is capable of maintaining heat resistance of a molded product to be formed therefrom. The molded product and the production method thereof of aspects of the present invention enable a molded product to be provided easily and reliably, while maintaining heat resistance. In addition, the aspects of the present invention render a thermoplastic resin having a high melting point applicable in a field of carbon fiber composite materials in which, conventionally, resins such as an epoxy resin were required whose fluidity can be ensured at a relatively low temperature.

BRIEF DESCRIPTION OF THE DRAWINGS

FIG. 1 is a schematic plan view showing an example of a gap processing device used for producing the resin composition of the present invention;

FIG. 3 is a schematic lateral view showing a production apparatus provided with the gap processing device of FIG. 1.

DESCRIPTION OF EMBODIMENTS

Figure 2:
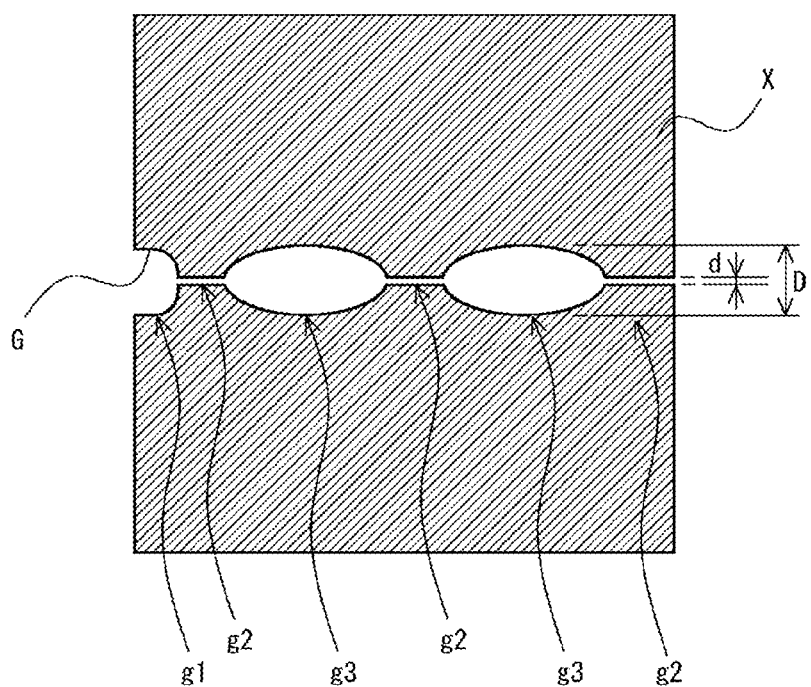
FIG. 2 is a schematic end view taken along an A-A line in FIG. 1.

The resin composition of the present invention will be described hereinafter. Typically, a polymer has a molecular weight distribution and a characteristic feature thereof is expressed as an average molecular weight. The average molecular weight may be either: a number average molecular weight (Mn) which is an arithmetic average of molecular weights of respective molecules; or a weight average molecular weight (Mw) calculated with an emphasis on high-molecular weight molecules. In the present invention, Mw is used. Mw can be measured by gel permeation chromatography (GPC).

Resin Composition

The resin composition of the present invention contains: a polymer that is a reaction product of a first organic compound having a phenolic hydroxyl group and a second organic compound having a glycidyl group, a weight average molecular weight of the polymer being no greater than 10,000; and a thermoplastic resin other than the polymer.

In the resin composition, it is preferred that the polymer and the thermoplastic resin have blended to form a homogeneous phase. Specifically, when the resin composition is observed with an electron micrograph, it is preferred that a phase of the polymer is not observed separately from a phase of the thermoplastic resin, but a homogeneous phase (may be also referred to as "single phase") is observed in which the polymer and the thermoplastic resin have blended.

The resin composition is solid at normal temperature. A form of the resin composition is not particularly limited and may be, for example, a pellet-like form.

Polymer

The polymer is a reaction product of the first organic compound and the second organic compound, a weight average molecular weight of the polymer being no greater than 10,000. The polymer may be used either alone of one type, or in combination of two or more types thereof.

The molecular weight of the polymer is polydisperse, and morphology of the molecular weight distribution is not particularly limited. The upper limit of Mw of the polymer is preferably 10,000, more preferably 7,000, and still more preferably 5,000. The lower limit of the Mw of the polymer is preferably 500 and more preferably 800. When the Mw is less than the upper limit, viscosity of the resin composition in a molten state may be further reduced. When the Mw is greater than the upper limit, the melting point of the resin composition may rise and viscosity of the resin composition in a molten state may be increased. To the contrary, when the Mw is less than the lower limit, Tg of the molded product to be formed from the resin composition may be lowered due to the plasticizing effect similar to that of a low molecular weight plasticizer.

It is to be noted that Tg becomes low owing to a known plasticizing effect, in a resin composition in which a low-molecular weight compound having monodisperse molecular weight distribution, in place of the polymer, is blended with a thermoplastic resin. It is inferred that the low-molecular weight compound lowers Tg, which is a factor related to molecular mobility of a thermoplastic resin, due to its low melting point and high molecular mobility.

First Organic Compound

The first organic compound having a phenolic hydroxyl group is exemplified by a phenol, a resin having a phenolic hydroxyl group, and the like. Examples of the resin having a phenolic hydroxyl group include: phenolic resins formed from a phenol and an aldehyde, such as a novolak-type phenolic resin and a resol-type phenolic resin; and the like. The first organic compound may be used either alone of one type, or in combination of two or more types thereof.

Examples of the phenol include: alkylphenols such as cresol, ethylphenol, xylenol, p-t-butylphenol, octylphenol, nonylphenol and dodecylphenol; p-phenylphenol; phenol; and the like. Of these, phenol is preferred. The phenol may be used either alone of one type, or in combination of two or more types thereof.

Examples of the aldehyde include formaldehyde, paraformaldehyde and the like. Of these, paraformaldehyde is preferred. The aldehyde may be used either alone of one type, or in combination of two or more types thereof.

The lower limit of Mw of the resin having a phenolic hydroxyl group is preferably 400 and more preferably 600. Meanwhile, the upper limit of the Mw is preferably 9,000, more preferably 6,000, and still more preferably 4,000. When the Mw is less than the lower limit, the Mw of the polymer may be lowered, and eventually Tg of a molded product to be formed from the resin composition may be lowered due to the plasticizing effect similar to that of a low molecular weight plasticizer. To the contrary, when the Mw is greater than the upper limit, the Mw of the polymer may be increased, and eventually the melting point of the resin composition may rise and viscosity of the resin composition in a molten state may be increased.

The first organic compound is preferably the phenol or the phenolic resin.

Second Organic Compound

The second organic compound having a glycidyl group is exemplified by a low-molecular weight compound having a glycidyl group, a resin having a glycidyl group, and the like. The second organic compound may be used either alone of one type, or in combination of two or more types thereof.

A glycidyl-containing group may be a glycidyl ether group, a glycidyl ester group, a glycidyl amino group or the like. Of these, a glycidyl ether group which is less likely to cause a side reaction is preferred.

Exemplary low-molecular weight compound having a glycidyl group includes methyl glycidyl ether, butyl glycidyl ether, 2-ethylhexyl glycidyl ether, p-sec-butylphenyl glycidyl ether, p-tert-butylphenyl glycidyl ether, phenyl glycidyl ether, bisphenol F diglycidyl ether, bisphenol A diglycidyl ether, glycidyl acrylate, glycidyl methacrylate, N,N-diglycidyl toluidine, N,N-diglycidyl aniline and the like. Of these, phenyl glycidyl ether which is inexpensive and less likely to cause a side reaction is preferred.

Exemplary resin having a glycidyl group includes an epoxy resin. Examples of the epoxy resin include a glycidyl ether epoxy resin, a glycidyl ester epoxy resin, a glycidyl amine epoxy resin, an oxidized epoxy resin. Of these, the glycidyl ether epoxy resin is preferred. According to the structure of a base compound, the epoxy resin may be classified into, for example, a bisphenol type, a novolak type, a brominated type and the like, all of which are suitable.

The lower limit of Mw of the resin having a glycidyl group is preferably 400 and more preferably 600. Meanwhile, the upper limit of the Mw is preferably 9,000, more preferably 6,000, and still more preferably 4,000. When the Mw is less than the lower limit, the Mw of the polymer is lowered, and eventually Tg of a molded product to be formed from the resin composition may be lowered due to the plasticizing effect similar to that of a low molecular weight plasticizer. To the contrary, when the Mw is greater than the upper limit, the Mw of the polymer may be increased, and eventually the melting point of the resin composition may rise and viscosity of the resin composition in a molten state may be increased.

The polymer is preferably a reaction product of the phenol resin as the first organic compound and the low-molecular weight compound having a glycidyl group as the second organic compound. The polymer is also preferably a reaction product of the phenol as the first organic compound and the epoxy resin as the second organic compound.

The lower limit of the proportion of the polymer contained in the resin composition is preferably 0.1% by mass, more preferably 1% by mass, and still more preferably 5% by mass. Meanwhile, the upper limit of the proportion of the polymer contained is preferably 30% by mass, more preferably 15% by mass, and still more preferably 10% by mass. When the proportion of the polymer contained is less than the lower limit, fluidity of the resin composition in a molten state may not be sufficiently improved. To the contrary, when the proportion of the polymer contained is greater than the upper limit, the plasticizing effect may be enhanced under the influence of a low-molecular weight compound inevitably contained in the polymer, and consequently Tg of the resin composition may be lowered.

When the proportion of the polymer contained in the resin composition is no less than 1% by mass, the effect of improving fluidity of the resin composition in a molten state may be produced more remarkably. Meanwhile, when the proportion of the polymer contained is no greater than 15% by mass, lowering of the melting point of the resin composition may be more effectively inhibited. Furthermore, when the proportion of the polymer contained is no greater than 10% by mass, bleedout of the polymer may be inhibited in the molded product to be formed from the resin composition.

Production Procedure of Polymer

The production procedure of the polymer is exemplified by a procedure including: mixing the first organic compound and the second organic compound (mixing step); permitting a mixture obtained to react (reaction step); and removing monomers from the mixture after the reaction (monomer removal step).

Mixing Step

A mixing process for the mixing step is exemplified by: a process of preparing a liquid form of at least one of the first organic compound and the second organic compound and then dissolving the another one into the liquid prepared; a process of dissolving the first organic compound and the second organic compound in an appropriate solvent; and the like. It is to be noted that, in the mixing step, a catalyst such as triphenylphosphine, and the like may further be added.

The lower limit of a ratio of the hydroxyl group equivalent of the first organic compound to the epoxy group equivalent of the second organic compound (hydroxyl group equivalent/epoxy group equivalent) is preferably 30/70 and more preferably 40/60. The upper limit of the equivalent ratio is preferably 70/30, and more preferably 60/40. The equivalent ratio is most preferably 50/50.

Reaction Step

Reaction conditions for the reaction step may involve, for example, a reaction temperature of no less than 80° C. and no greater than 150° C., and a reaction time period of no less than 30 min and no greater than 10 hrs. A reaction product obtained may be subjected to, as needed, a vacuum treatment with heating to remove volatile components. In this case, vacuum heating conditions may involve, for example, a vacuum heating temperature of no less than 150° C. and no greater than 200° C., and a vacuum heating time period of no less than 10 min and no greater than 300 min.

Thermoplastic Resin

The thermoplastic resin is not particularly limited, and exemplified by: engineering plastics such as polyamide, polyetheretherketone, polyacetal, polyetherimide, polyethersulfone, polyphenylsulfone, polyphenylene sulfide, polyphenylene ether, polycarbonate and thermoplastic polyimide; polypropylene; polyester; an acrylonitrile-butadiene copolymer; a methyl methacrylate copolymer; polyvinyl chloride; polystyrene; polyoxymethylene; thermoplastic polyurethane; polyethylene terephthalate; polybutylene terephthalate; polyarylamide; and the like. Of these, the engineering plastics are preferred in light of strength.

It is preferred that a melting point of the thermoplastic resin is no less than 200° C. For such a thermoplastic resin having a relatively high melting point, it is difficult to ensure fluidity upon molding without heating at a higher temperature compared to common thermoplastic resins; however, heating at such a high temperature is likely to cause a rise in production cost, heat deterioration of other additives, and the like. Accordingly, in the case of producing a molded product using the aforementioned thermoplastic resin having a relatively high melting point, it is particularly important that fluidity may be ensured at a temperature as low as possible close to the melting point. In this respect, according to the resin composition of the present embodiment, due to the polymer improving fluidity of the resin composition in a molten state, sufficient fluidity is readily ensured even at a temperature close to the melting point of the thermoplastic resin, and consequently the aforementioned thermoplastic resin having a relatively high melting point may be suitably used. Examples of the thermoplastic resin having a melting point of no less than 200° C. include polyamide, polyetheretherketone, polyetherimide, polyethersulfone, polyphenylsulfone, polyphenylene sulfide, polyphenylene ether, thermoplastic polyimide, polyethylene terephthalate, polybutylene terephthalate, polyarylamide, and the like.

It is preferred that the thermoplastic resin has a benzene ring. When the thermoplastic resin has a benzene ring in a molecule, compatibility is enabled to be improved owing to an interaction with an aromatic ring to which the phenolic hydroxyl group in the aforementioned polymer bonds, and consequently the effect of improving fluidity of the resin composition in a molten state is enabled to be reliably produced. Examples of the thermoplastic resin having a benzene ring include polyetheretherketone, polyethylene terephthalate, polybutylene terephthalate, polyetherimide, polyethersulfone, polyphenylsulfone, polyphenylene sulfide, polyphenylene ether, polyarylamide, polycarbonate, polyimide, polystyrene, and the like.

The lower limit of the proportion of the thermoplastic resin contained in the resin composition is preferably 50% by mass, more preferably 60% by mass, still more preferably 70% by mass, and particularly preferably 85% by mass. Meanwhile, the upper limit of the proportion of the thermoplastic resin is preferably 99.9% by mass, more preferably 99.0% by mass, and still more preferably 95% by mass. When the proportion of the thermoplastic resin contained is less than the lower limit, strength, etc. of a molded product to be formed from the resin composition may be reduced. To the contrary, when the proportion of the thermoplastic resin contained is greater than the upper limit, the proportion of the polymer contained is reduced, and consequently the effect of improving fluidity of the resin composition in a molten state may be insufficient.

Optional Component

The resin composition may further contain as optional component(s): polymer compounds other than the aforementioned polymer and the thermoplastic resin; various types of additives employed in a polymer processing field; reinforcement materials such as carbon fiber, glass fiber and fillers; and the like. The polymer compound is exemplified by a rubber.

When the resin composition contains the reinforcement material, the lower limit of the proportion of the reinforcement material contained in the resin composition is preferably 5% by mass, more preferably 20% by mass, and still more preferably 30% by mass. Meanwhile, the lower limit of the proportion of the reinforcement material contained in the resin composition is preferably 50% by mass and more preferably 40% by mass.

Production Method of Resin Composition

The production method of the resin composition is exemplified by a method involving a step of melt-kneading the polymer and the thermoplastic resin, as well as other additive(s) added as needed (melt kneading step), and the like. The resin composition obtained after the melt kneading step may be cooled in a water bath, etc. and then pelletized by a pelletizer, etc.

Melt Kneading Step

In the melt kneading step, the polymer and the thermoplastic resin, as well as other additive(s) added as needed, are melt-kneaded. This step enables homogeneous mixing of the components.

Prior to the melt kneading step, other components required for production of the resin composition may be preliminarily mixed to prepare a masterbatch. For the preliminary mixing, well-known mixers may be used, for example: batch-type mixing machines such as a mixer-type mixing machine, a V-type blender, a tumbler-type mixing machine, a Henschel mixer, a Bunbury mixer and a roller mixer; continuous kneading machines such as a single-screw kneading machine and a twin-screw kneading machine; and the like.

A procedure for melt-kneading the components in the melt kneading step is exemplified by a procedure of melt-kneading the components by using a kneading machine well-known in the art, e.g., a Bunbury mixer, a roller mixer, a Brabender, a single-screw kneading extruder, a twin-screw kneading extruder and a kneader, while appropriately adjusting conditions such as a kneading rate, a kneading temperature and a kneading time period. Of these, in light of stable production of a large amount of the resin composition, i.e., production efficiency, the twin-screw kneading extruder is suitably used. Conditions of the kneading machine such as a kneading speed, a kneading temperature, a kneading time period may be adjusted accordingly. The specific kneading temperature may be, for example, no less than 200° C. and no greater than 350° C. The lower limit of a rotation frequency of the kneading machine is preferably 50 rpm and more preferably 200 rpm. Meanwhile, the upper limit of the rotation frequency is preferably 1,000 rpm and more preferably 400 rpm.

Gap-Passing Process Substep

The melt kneading step preferably includes a step of processing the molten kneaded product by passing through a gap between two surfaces (gap-passing process substep) as needed. The gap includes a passage portion having a smaller inter-surface distance in a thickness direction and an extended portion having a greater inter-surface distance in the thickness direction. It is preferred that the passage portion and the extended portion are provided alternately. By passing the kneaded product through such a gap, melt kneading by chaotic mixing is enabled. Specifically, a continuous laminar shearing flow of the kneaded product is generated, whereby efficient dispersion mixing is enabled while negative effects such as a reduction in molecular weight of the thermoplastic resin are prevented.

For example in the case of using a twin-screw kneading extruder as the kneading machine, the gap-passing process substep may be realized by providing at a discharge opening of the twin-screw kneading extruder a die, as a gap-passing process device, having a gap between two surfaces thereinside. A preset temperature of the gap-passing process device is not particularly limited, and may be, for example, no less than 200° C. and no greater than 300° C.

FIGS. 1 and 2 show an example of the gap-passing process device. A gap-passing process device X is a cuboidal member including a gap G, which is a through hole from one side to the other side having a substantially flat shape. Hereinafter, in regard to the gap G, a through-axis direction is referred to as a "kneaded product flow direction", a direction orthogonal to the through-axis direction and to the thickness direction is referred to as a "width direction", and a distance between one end to the other end in the thickness direction is referred to as an "inter-surface distance". For the gap G, a side in contact with the discharge opening of the kneading machine is referred to as an "inlet", and an opposite side is referred to as an "outlet".

In order to receive the kneaded product in a molten state discharged from the kneading machine, the inlet of the gap G has a shape corresponding to the discharge opening of the kneading machine. The shape of the inlet is not particularly limited, and may be changed in accordance with a shape of the discharge opening of the kneading machine. In regard to the gap G, from the inlet to a predetermined distance in the kneaded product flow direction, the width gradually increases while the inter-surface distance gradually decreases, whereby an inlet portion g1, which is a space having a trapezoid shape in a planar view and a semicircular shape in a side view, is formed. The lower limit of an average width w at an outlet (where the width of the gap G ceases to gradually increase and where the inter-surface distance of the gap G ceases to gradually decrease) of the inlet portion g1 is preferably 5 mm and more preferably 10 mm. Meanwhile, the upper limit of the average width w is preferably 5,000 mm and more preferably 2,000 mm. The lower limit of an average inter-surface distance d at a position where the inter-surface distance is the smallest at the outlet of the inlet portion g1 is preferably 0.1 mm and more preferably 0.2 mm. Meanwhile, the upper limit of the average inter-surface distance d is preferably 5 mm and more preferably 3 mm. When the average inter-surface distance d falls within the above range, chaotic mixing may be reliably carried out while clogging of the gap G is inhibited.

A portion of the gap G closer to an outlet-side than the inlet portion g1 includes passage portions g2 in which the inter-surface distance is maintained to be the average inter-surface distance d at the outlet of the inlet portion g1, and extended portions g3 in which the inter-surface distance is greater than that of the passage portion g2. Specifically, from the outlet of the inlet portion g1, a first passage portion g2, a first extended portion g3, a second passage portion g2, a second extended portion g3, and a third passage portion g2 are consecutively arranged in this order, with an outlet-side end the third passage portion g2 being the outlet of the gap G.

The passage portion g2 is a flat space. The lower limit of an average length m of the passage portion g2 in the kneaded product flow direction is preferably 5 mm and more preferably 10 mm. Meanwhile, the upper limit of the average length m of the passage portion g2 is preferably 100 mm and more preferably 50 mm. When the average length m of the passage portion g2 falls within the above range, chaotic mixing may be reliably carried out.

The extended portion g3 is a space having a substantially cylindroid shape which is substantially elliptic in a lateral view and rectangular in a planar view, in which an inlet and an outlet are provided in the vicinities of both ends of a virtual longitudinal axis of the ellipse, respectively. The average inter-surface distances at the inlet and the outlet of the extended portion g3 are each the same as the average inter-surface distance of the passage portion 2. On the other hand, in the extended portion g3, the average inter-surface distance gradually increases from the inlet toward a center in the kneaded product flow direction along the kneaded product flow direction, while the average inter-surface distance gradually decreases from the center in the kneaded product flow direction toward the outlet along the kneaded product flow direction. Due to the extended portion g3 having such a shape, a part of the kneaded product in a molten state passing therethrough tends to flow from the inlet to the outlet in the shortest way, while other part thereof tends to flow from the inlet to the outlet along an external surface of the extended portion g3 (inner wall of the gap-passing process device X). As a result, in the kneaded product in a molten state passing through the extended portion g3, a difference in speed in the kneaded product flow direction is produced, whereby chaotic mixing is carried out.

The lower limit of the maximum inter-surface distance D in the extended portion g3 is preferably 1 mm and more preferably 3 mm. Meanwhile, the upper limit of the maximum inter-surface distance D is preferably 100 mm and more preferably 50 mm. It is to be noted that the maximum inter-surface distance D preferably falls within a range from twice to 20 times the average inter-surface distance d. The lower limit of an average length l of the extended portion g3 in the kneaded product flow direction is preferably 5 mm and more preferably 10 mm. Meanwhile, the upper limit of the average length l of the extended portion g3 is preferably 300 mm and more preferably 100 mm. When the dimensions of the extended portion g3 fall within the above ranges, chaotic mixing may be more efficiently carried out.

It is to be noted that FIGS. 1 and 2 show a mere example of the gap-passing process device, and the gap-passing process device is not limited to this configuration. More specifically, the extended portion is substantially elliptic in the lateral view in FIGS. 1 and 2; however, the extended portion may be have other shape. Specifically, two surfaces on one side and the other side in the thickness direction may be a planar surface, a curved surface, or a combination thereof. However, in light of prevention of a negative effect to the resin composition, the two surfaces are preferably curved surfaces. Specifically, the two surfaces in the extended portion g3 are preferably such curved surfaces that, the inter-surface distance gradually increases from the inlet toward the center in the kneaded product flow direction along the kneaded product flow direction, while the inter-surface distance gradually decreases from the center in the kneaded product flow direction toward the outlet along the kneaded product flow direction.

In FIGS. 1 and 2, the number of the extended portions in the gap of the gap-passing process device is two; however, the number is not limited thereto and may also be one or three or more. The number of the extended portions in the gap of the gap-passing process device may be, for example, no less than two and no greater than 10.

As the gap-passing process device, the devices disclosed in Japanese Unexamined Patent Application, Publication Nos. 2011-26364 and 2013-028795 may also be used.

FIG. 3 shows an example of a production apparatus which may be suitably used for the production method of the resin composition. The production apparatus includes: a kneading machine M; a feeder F provided in the kneading machine M; the gap-passing process device X which is a die provided at the discharge opening of the kneading machine M; a first belt B1 provided at the discharge opening of the gap-passing process device X; a water bath W provided in the course of conveyance by the first belt B1; a pelletizer P provided at a destination by the first belt B1; a second belt B2 provided at a discharge opening of the pelletizer P; and a collection vessel V provided at a destination by the second belt B2.

According to the production apparatus, a kneaded product obtained from the components in the kneading machine M is passed through the gap-passing process device X to enable chaotic mixing; the kneaded product in a strand-like form obtained after the chaotic mixing is conveyed by the first belt B1 with cooling in the water bath W in the course thereof; and the kneaded product thus cooled can be pelletized by the pelletizer P and then further conveyed by the second belt B2 to the collection vessel V where pellets can be collected. Meanwhile, the feeder F enables adjustment of ratios of the components.

Molded Product

The molded product of the present invention is formed from the aforementioned resin composition. An intended usage of the molded product is not particularly limited, and the molded product may be used, for example, for engine parts, driving system parts, lighting system parts, cooling system parts and the like, as well as for an electronic control system, in the automobile industry. The molded product may also be used for parts for household appliances, office appliances and the like, in which heat resistance, chemical resistance, water resistance and the like are required.

Production Method of Molded Product

The production method of a molded product according to the present invention includes: a step of kneading the resin composition by chaotic mixing (kneading step); and a step of molding a kneaded product obtained after the kneading step (molding step). The production method of a molded product enables the molded product to be produced easily and reliably.

Kneading Step

In this step, the resin composition is kneaded by chaotic mixing. The specific kneading procedure may be the same as that for the kneading step in the production method of the resin composition except that the resin composition is used as a material, and descriptions thereof are therefore omitted.

Molding Step

In this step, the kneaded product obtained after the kneading is molded. The specific molding procedure is not particularly limited, and may be extrusion molding, injection molding, transfer molding, and the like.

EXAMPLES

Hereinafter, the embodiment of the present invention will be explained in more detail by way of Examples, but the present invention is not in any way limited to these Examples.

Production of Polymer

Production Example 1

Into a 1-L flask, 104 g of a novolak-type phenolic resin ("SP1010" available from ASAHI YUKIZAI CORPORATION; hydroxyl group equivalent: 104 g/eq) as the first organic compound, and 150 g of phenyl glycidyl ether (available from Tokyo Chemical Industry Co., Ltd.; epoxy equivalent: 150 g/eq) as the second organic compound were charged, and heated at 80° C. to melt the novolak resin. After adding 1.5 g of triphenylphosphine (available from Tokyo Chemical Industry Co., Ltd.) thereto, the mixture thus obtained was heated to 110° C. and then permitted to react for 3 hrs. A polymer obtained as a reaction product was heated to 170° C. and then volatile components were removed in vacuo for 30 min. Thereafter, after recovering pressure and cooling to 150° C., the polymer was discharged. For the polymer thus produced, the standard polystyrene equivalent Mw was obtained by gel permeation chromatography ("SC-8020" available from Tosoh Corporation, columns: "G2000H"×1 and "G4000H"×1, detector: UV254 nm, carrier: tetrahydrofuran (1 ml/min), column temperature: 40° C.). The Mw was determined to be 3,500. Polymer A was thus obtained.

Production Example 2

A polymer was synthesized in a similar manner to Production Example 1, except that 130 g of phenyl glycidyl ether and 20 g of bisphenol F diglycidyl ether (available from Tokyo Chemical Industry Co., Ltd.; epoxy equivalent: 340 g/eq) were collectively used in place of 150 g of phenyl glycidyl ether as the second organic compound. The Mw of the polymer thus synthesized was determined to be 6,200 by gel permeation chromatography. Polymer B was thus obtained.

Production Example 3

A polymer was synthesized in a similar manner to Production Example 1, except that 104 g of a novolak-type phenolic resin ("CP506F" available from ASAHI YUKIZAI CORPORATION; hydroxyl group equivalent: 104 g/eq) was used as the first organic compound. The Mw of the polymer thus synthesized was determined to be 1,400 by gel permeation chromatography. Polymer C was thus obtained.

Production Example 4

A polymer was synthesized in a similar manner to Production Example 1, except that 83 g of phenol (available from Mitsubishi Chemical Corporation; hydroxyl group equivalent: 94 g/eq) was used in place of the novolak-type phenolic resin as the first organic compound, and 175 g of a novolak-type epoxy resin ("YDCN704" available from NIPPON STEEL Chemical & Material CO., LTD.; epoxy group equivalent: 220 g/eq) was used in place of the phenyl glycidyl ether as the second organic compound. The Mw of the polymer thus synthesized was determined to be 5,200 by gel permeation chromatography. Polymer D was thus obtained.

Production Example 5

A polymer was synthesized in a similar manner to Production Example 1, except that 23 g of phenol (available from Mitsubishi Chemical Corporation) was used in place of the novolak-type phenolic resin as the first organic compound, and 225 g of a bisphenol F epoxy resin ("YDF2004" available from NIPPON STEEL & SUMITOMO METAL CORPORATION; epoxy group equivalent: 904 g/eq) was used in place of the phenyl glycidyl ether as the second organic compound. The Mw of the polymer thus synthesized was determined to be 4,800 by gel permeation chromatography. Polymer E was thus obtained.

Production Example 6

A polymer was synthesized in a similar manner to Production Example 1, except that 142 g of glycidyl methacrylate (available from Tokyo Chemical Industry Co., Ltd.; epoxy equivalent: 142 g/eq) was used in place of 150 g of phenyl glycidyl ether as the second organic compound. The Mw of the polymer thus synthesized was determined to be 3,780 by gel permeation chromatography. Polymer F was thus obtained.

Production Example 7

A polymer was synthesized in a similar manner to Production Example 1, except that 130 g of phenyl glycidyl ether and 20 g of N,N-diglycidyltoluidine (available from Nippon Kayaku Co., Ltd.; epoxy equivalent: 133 g/eq) were collectively used in place of 150 g of phenyl glycidyl ether as the second organic compound. The Mw of the polymer thus synthesized was determined to be 7,000 by gel permeation chromatography. Polymer G was thus obtained.

Production of Resin Composition

A resin composition was produced by the aforementioned production apparatus shown in FIG. 3. As the kneading machine M, a twin-screw kneading extruder "HYPER-KTX46" available from Kobe Steel, Ltd. (hereinafter, may be also referred to as "KTX46") was used. To a discharge opening of KTX46, a die available from Kodaira Seisakusho Co., Ltd., as the gap-passing process device X for carrying out chaotic mixing was attached. The feeder F and the pelletizer P attached to KTX46 were synchronized such that a resin discharge amount of the twin-screw kneading extruder was 100 kg/h. The water bath W having a length of 3 m for cooling the strand was provided before the pelletizer P.

As the gap-passing process device X, the aforementioned device shown in FIGS. 1 and 2 was used. The gap-passing process device X had three passage portions g2 each having: average inter-surface distance d being 1 mm; average width w being 400 mm; and average length m being 20 mm. A preset temperature of the gap-passing process device X was 250° C.

KTX46 had a rotor segment as a screw segment at two positions, and operating conditions of KTX46 involved a rotation frequency of 300 rpm and a kneading temperature of 290° C.

Example 1

In a tumbler, 1.4 kg of the polymer A in a powder form and 20 kg of polyphenylene sulfide (PPS) as the thermoplastic resin ("#160" available from Tosoh Corporation) were mixed for 20 min. The mixture thus obtained was kneaded by the twin-screw kneading extruder to give a kneaded product, which was then passed through the gap-passing process device X and extruded from the discharge opening. Thereafter, the kneaded product extruded was cooled in the water bath W and processed by the pelletizer P to produce resin composition pellets. The pellets were dried at 80° C. for 5 hrs.

Example 2

Resin composition pellets were produced under the same conditions as Example 1, except that the polymer B was used in place of the polymer A.

Example 3

Resin composition pellets were produced under the same conditions as Example 1, except that the polymer C was used in place of the polymer A.

Example 4

Resin composition pellets were produced under the same conditions as Example 1, except that the polymer D was used in place of the polymer A.

Example 5

Resin composition pellets were produced under the same conditions as Example 1, except that the polymer E was used in place of the polymer A.

Example 6

Resin composition pellets were produced under the same conditions as Example 1, except that the polymer F was used in place of the polymer A.

Example 7

Resin composition pellets were produced under the same conditions as Example 1, except that the polymer G was used in place of the polymer A.

Example 8

Resin composition pellets were produced under the same conditions as Example 1, except that chaotic mixing was omitted by removing the gap-passing process device X from the kneading machine M.

Example 9

Resin composition pellets were produced under the same conditions as Example 8, except that polyphenylene sulfide (PPS) ("A503-X05" available from Toray Industries, Inc.; 30% glass fiber) was used in place of PPS ("#160" available from Tosoh Corporation) as the thermoplastic resin.

Example 10

In a Henschel mixer, 1.4 kg of the polymer A in a powder form and 20 kg of polybutylene terephthalate (PBT) ("TORAYCON 1401X06" available from Toray Industries, Inc.) as the thermoplastic resin were mixed for 20 min. The mixture thus obtained was kneaded by the kneading machine M without the gap-passing process device X and extruded from the discharge opening. Thereafter, the kneaded product extruded was cooled in the water bath W and processed by the pelletizer P to produce resin composition pellets. The pellets were dried at 110° C. for 5 hrs.

Example 11

In a Henschel mixer, 1.4 kg of the polymer A in a powder form, 20 kg of polybutylene terephthalate (PBT) ("TORAY-CON 1401X06" available from Toray Industries, Inc.) as the thermoplastic resin, and 13 kg of glass fiber ("CS(F)3" available from Nitto Boseki Co., Ltd.) were mixed for 20 min. The mixture thus obtained was kneaded by the kneading machine M without the gap-passing process device X and extruded from the discharge opening. Thereafter, the kneaded product extruded was cooled in the water bath W and processed by the pelletizer P to produce resin composition pellets. The pellets were dried at 110° C. for 5 hrs.

Comparative Example 1

Resin composition pellets were produced under the same conditions as Example 1, except that the polymer A was not used and solely polyphenylene sulfide (PPS) ("#160" available from Tosoh Corporation) as the thermoplastic resin was used.

Comparative Example 2

Resin composition pellets were produced under the same conditions as Example 8, except that the polymer A was not used and solely polyphenylene sulfide (PPS) ("#160" available from Tosoh Corporation) as the thermoplastic resin was used.

Comparative Example 3

Resin composition pellets were produced under the same conditions as Example 9, except that the polymer A was not used and solely polyphenylene sulfide (PPS) ("A503-X05" available from Toray Industries, Inc.; 30% glass fiber) as the thermoplastic resin was used.

Comparative Example 4

Resin composition pellets were produced under the same conditions as Example 8, except that the polymer A was not used and solely 20 g of polyphenylene sulfide (PPS) ("#160" available from Tosoh Corporation) and 1.4 kg of polyamide (nylon-6) ("CM1017" available from Toray Industries, Inc.; Tg=48° C.) as the thermoplastic resins were used.

Comparative Example 5

Resin composition pellets were produced under the same conditions as Example 10, except that the polymer A was not used.

Comparative Example 6

Resin composition pellets were produced under the same conditions as Example 11, except that the polymer A was not used.

Evaluations

For the resin composition pellets obtained as described above, a fluidity evaluation (melt flow rate, MFR) and a thermal analysis were conducted according to the following procedures. The results are shown in Tables 1 and 2.

Fluidity Evaluation (MFR)

A MFR of the pellets of each resin composition was measured by using "Melt Indexer F-F01" available from Toyo Seiki Seisaku-sho, Ltd. In the case of the pellets obtained by using PPS as the thermoplastic resin, measurement conditions involved a measurement load of 5 kg, a measurement temperature of 280° C., 285° C. or 290° C.; meanwhile, in the case of the pellets obtained by using PBT as the thermoplastic resin, measurement conditions involved a measurement load of 2.16 kg, a measurement temperature of 230° C., 240° C. or 250° C. A denotation "Fast Flux" in Table 1 indicates that the fluidity was so high that the measurement of MFR failed. A denotation "Measurement Failed" in Table 2 indicates that fluidity was so low that the measurement of MFR failed.

Thermal Analysis (DSC)

For the pellets of each resin composition, Tg and Tm (melting point) were measured by using "DSC8500" (available from PerkinElmer Co., Ltd.) with a rate of temperature rise of 10° C./min. A peak-top temperature was obtained as a measurement value.

TABLE 1

| | | | Example 1 | Example 2 | Example 3 | Example 4 | Example 5 | Example 6 |
|---|---|---|---|---|---|---|---|---|
| Composition | Polymer | | A | B | C | D | E | F |
| | Thermoplastic resin | | PPS | PPS | PPS | PPS | PPS | PPS |
| | Other | | — | — | — | — | — | — |
| Chaotic mixing | | | Yes | Yes | Yes | Yes | Yes | Yes |
| Evaluation | MFR (g/10 min) 2.16 kg load | 230° C. | — | — | — | — | — | — |
| | | 240° C. | — | — | — | — | — | — |
| | | 250° C. | — | — | — | — | — | — |
| | MFR (g/10 min) 5 kg load | 280° C. | 2.4 | 9.1 | 4.1 | 8.5 | 8.9 | 2.3 |
| | | 285° C. | 56.4 | 66.4 | 36.9 | 64.1 | 65.2 | 56.1 |
| | | 290° C. | Fast flux | Fast flux | Fast flux | Fast flux | Fast flux | Fast flux |
| | DSC | Tg (° C.) | 89.5 | 89.0 | 89.4 | 88.5 | 88.0 | 87.5 |
| | | Tm (° C.) | 281 | 280 | 283 | 280 | 280 | 276 |

| | | | Example 7 | Example 8 | Example 9 | Example 10 | Example 11 |
|---|---|---|---|---|---|---|---|
| Composition | Polymer | | G | A | A | A | A |
| | Thermoplastic resin | | PPS | PPS | PPS | PBT | PBT |
| | Other | | — | — | Glass fiber | — | Glass fiber |
| Chaotic mixing | | | Yes | No | No | No | No |
| Evaluation | MFR (g/10 min) 2.16 kg load | 230° C. | — | — | — | 2.2 | 1.9 |
| | | 240° C. | — | — | — | 44.1 | 40.5 |
| | | 250° C. | — | — | — | 118.2 | 108.1 |
| | MFR (g/10 min) 5 kg load | 280° C. | 2.3 | 2.1 | 1.5 | — | — |
| | | 285° C. | 49.0 | 46.4 | 32.8 | — | — |
| | | 290° C. | Fast flux | Fast flux | Fast flux | — | — |
| | DSC | Tg (° C.) | 89.0 | 89.3 | 92.1 | 28.1 | 30.0 |
| | | Tm (° C.) | 279 | 283 | 278 | 224 | 224 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Composition | Polymer | | — | — | — | — | — | — |
| | Thermoplastic resin | | PPS | PPS | PPS | PPS + Nylon-6 | PBT | PBT |
| | Other | | — | — | Glass fiber | — | — | Glass fiber |
| Chaotic mixing | | | Yes | No | No | No | No | No |
| Evaluation | MFR(g/10 min) 2.16 kg load | 230° C. | — | — | — | — | Measurement failed | Measurement failed |
| | | 240° C. | — | — | — | — | 28.3 | 26.2 |
| | | 250° C. | — | — | — | — | 105.4 | 97.2 |
| | MFR(g/10 min) 5 kg load | 280° C. | Measurement failed | Measurement failed | Measurement failed | Measurement failed | — | — |
| | | 285° C. | Measurement failed | Measurement failed | Measurement failed | Measurement failed | — | — |
| | | 290° C. | 10 | 9.5 | 8.6 | 26.4 | — | — |
| | DSC | Tg (° C.) | 89.4 | 88.0 | 92.0 | 82.0 | 28.1 | 30.0 |
| | | Tm (° C.) | 283 | 283 | 283 | 280 | 224 | 224 |

As is clear from the results of fluidity (MFR) shown in Tables 1 and 2, owing to the polymers A to E added, the resin compositions of Examples 1 to 11 had improved fluidity (MFR) in comparison with the resin compositions of Comparative Examples 1 to 6. The resin compositions of Examples 1 to 11 were thus proven to be superior in fluidity in a molten state. Furthermore, as is clear from the results of the thermal analysis, the resin compositions of Examples 1 to 11 hardly exhibited decreases in Tg and Tm due to addition of the polymers A to E, compared to Comparative Examples 1 to 11. The resin compositions of Examples 1 to 11 were thus proven to be capable of maintaining heat resistance of molded products formed therefrom.

Discoloration-Preventing Effect of Polymer

A resin composition obtained by adding 0.5% by mass of the polymer A to homopolypropylene ("J-700GP" available from Prime Polymer Co., Ltd.) was kneaded and then pelletized. The pellets thus obtained were retained for 30 min in a cylinder of an injection molding device with molding conditions involving a temperature of 210° C., and then injection-molded. The molded product thus formed exhibited no visible discoloration. On the other hand, the molded product formed from homopolypropylene without the polymer A added exhibited visible discoloration. From these results, it was proven that using of a polymer, particularly a polymer having a phenol resin-like structure, in the resin composition enabled an antioxidant effect equivalent to that of a well-known antioxidant to be produced, and eventually an effect of preventing discoloration of a molded product to be produced.

INDUSTRIAL APPLICABILITY

The resin composition of the present invention is superior in fluidity in a molten state, and is capable of maintain heat resistance of a molded product to be formed therefrom. The molded product and the production method thereof of the present invention enables a molded product to be provided easily and reliably, while maintaining heat resistance. In addition, the present invention enables application of a thermoplastic resin having a high melting point in a field of carbon fiber composite materials in which, conventionally, resins such as an epoxy resin were required whose fluidity can be ensured at a relatively low temperature.

EXPLANATION OF THE REFERENCE SYMBOLS

X Gap-passing process device
G Gap
g1 Inlet portion
g2 Passage portion
g3 Extended portion
F Feeder
M Kneading machine
B1 First belt
B2 Second belt
W Water bath
P Pelletizer
V Collection vessel

The invention claimed is:

1. A resin composition comprising:
a polymer that is a reaction product of a first organic compound comprising a phenolic hydroxyl group and a second organic compound comprising a glycidyl group, a weight average molecular weight of the polymer being no greater than 10,000; and
a thermoplastic resin other than the polymer,
wherein the first organic compound is either only one phenol or a combination of two or more phenols, or a resin having a phenolic hydroxyl group,
wherein the resin having a phenolic hydroxyl group is a phenolic resin selected from the group consisting of a novolak phenolic resin and a resol phenolic resin, the phenolic resin being formed from a phenol and an aldehyde, and
the phenol is at least one selected from the group consisting of alkylphenols, p-phenylphenol, and phenol,
wherein the second organic compound is either only one compound or a combination of two or more compounds selected from the group consisting of methyl glycidyl ether, butyl glycidyl ether, 2-ethylhexyl glycidyl ether, p-sec-butylphenyl glycidyl ether, p-tert-butylphenyl glycidyl ether, phenyl glycidyl ether, glycidyl acrylate, glycidyl methacrylate, N,N-diglycidyl toluidine, and N,N-diglycidyl aniline, and
wherein a melting point of the thermoplastic resin is no less than 200° C.

2. The resin composition according to claim 1, wherein the glycidyl group is one of a glycidyl ether group, a glycidyl ester group and a glycidyl amino group.

3. The resin composition according to claim 2, wherein the glycidyl group is a glycidyl ether group.

4. The resin composition according to claim 1, wherein a proportion of the polymer comprised in the resin composition is no less than 0.1% by mass and no greater than 30% by mass.

5. The resin composition according to claim 1, wherein the thermoplastic resin comprises a benzene ring in a molecule.

6. The resin composition according to claim 1, wherein the polymer and the thermoplastic resin are blended as a homogeneous phase.

7. A molded product formed from the resin composition according to claim 1.

8. A method of producing a molded product comprising:
kneading the resin composition according to claim 1 by chaotic mixing; and
molding the kneaded resin composition to form the molded product.

9. The resin composition according to claim 1, wherein the alkylphenols are selected from the group consisting of cresol, ethylphenol, xylenol, p-t-butylphenol, octylphenol, nonylphenol and dodecylphenol.

* * * * *